Oct. 9, 1962 J. B. SHIELDS 3,057,727
METHOD OF MANUFACTURING AN INSTANTIZED PRODUCT
Filed Sept. 29, 1958
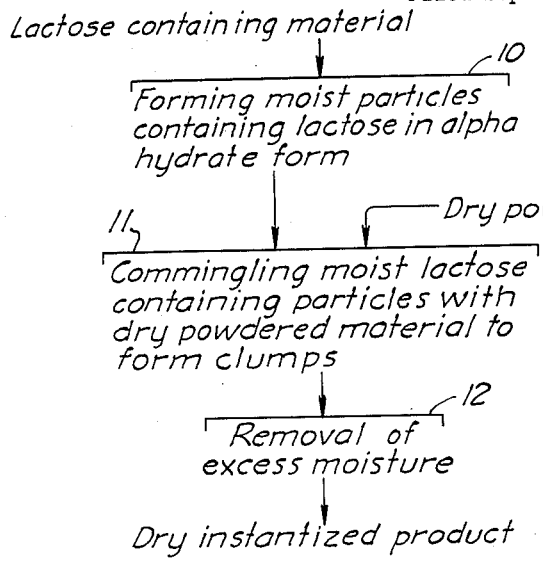
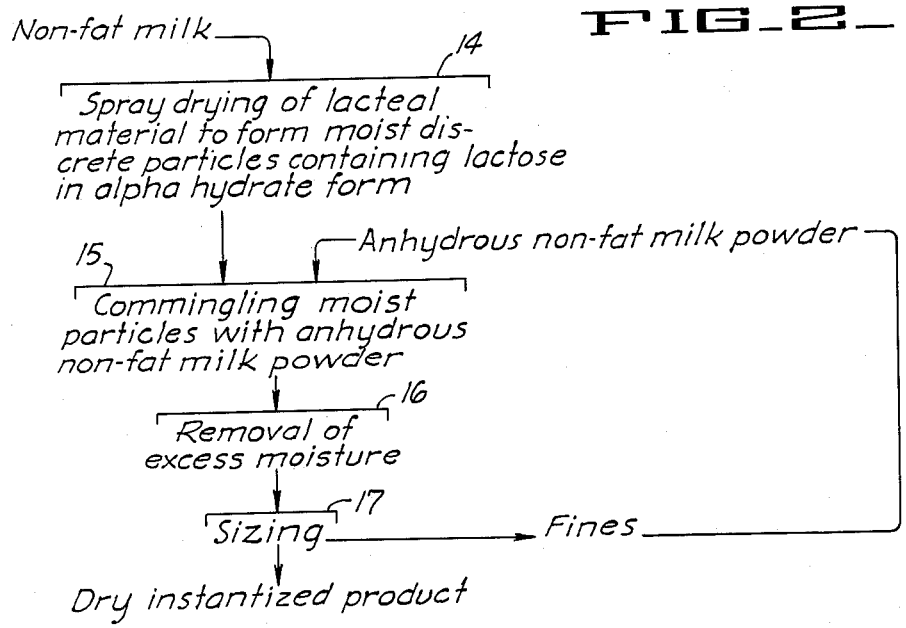
INVENTOR.
John B. Shields
BY
ATTORNEYS United States Patent Office 3,057,727
Patented Oct. 9, 1962

3,057,727
METHOD OF MANUFACTURING AN
INSTANTIZED PRODUCT
John B. Shields, Sunnyvale, Calif., assignor to Foremost Dairies, Inc., San Francisco, Calif., a corporation of New York
Filed Sept. 29, 1958, Ser. No. 763,883
6 Claims. (Cl. 99—56)

This invention relates generally to instantized dry food products, and method for manufacture.

In the past, so-called "instant non-fat powdered milk" has been manufactured and widely marketed in the United States. Such products are characterized by high wettability, and by the fact that they can be readily dispersed in cold water by simple stirring to form a stable, reconstituted milk. In contrast with such instantized products, ordinary spray dried non-fat milk powder has poor wettability, and cannot be quickly dispersed in cold water by simple stirring. Ordinary spray dried non-fat milk powder is of relatively small particle size, and the individual particles are in the form of hollow spheres. The instant dry milk product is in the form of aggregates, the aggregates being of a size considerably larger than the particle size of spray dried milk powder.

Processes used in the past for commercial production of instant non-fat milk powder either have produced the desired aggregate form by a straight through procedure, commencing with liquid concentrate and proceeding directly to the formation of aggregates, or by a wet back procedure involving moistening the spray dried powder to make the individual particles sticky and causing the sticky particles to be brought into random contacts to form the aggregates.

Due to inherent characteristics, such prior processes are subject to certain limitations. Considerable care must be taken in the handling of the moist aggregates immediately preceding and during removal of excess moisture to form the final product, because the aggregates are susceptible to compacting to form a cake, in place of the desired discrete product. All of the material must be capable of tolerating the amount of moisture required (e.g. 10–20%) for formation of the aggregates, because the moisture contact is homogeneously distributed up to the point of removing excess moisture. In the final step of removing excess moisture, all of the moisture used for formation of the aggregates must be removed, thus making this step a major drying operation, in contrast with the simpler drying operation made possible by the present invention. The factors just mentioned and others make for substantial increased costs of production over the cost of producing a simple spray dried product, and in addition such processes cannot be applied to a wide variety of products, having characteristics differing considerably from non-fat milk powder.

In general it is an object of the present invention to provide a new method or process for the manufacture of instantized products.

Another object of the invention is to provide a method of the above character which is relatively economical, and which can be applied to a wide variety of food products.

Another object of the invention is to provide a process of the above character which does not impair palatability, flavor or solubility of the final product.

A further object of the invention is to provide novel "instant" products resulting from the present process.

Additional objects and features of the invention will appear from the following description in which the preferred embodiments have been set forth in detail in conjunction with the accompanying drawing.

Referring to the drawing:

FIGURE 1 is a flow sheet illustrating a general procedure for carrying out the present invention.

FIGURE 2 is another flow sheet illustrating a particular procedure for the production of a dry instantized milk product.

In accordance with the present invention, I form moist discrete particles of lactose in the alpha hydrate form, or moist particles of material containing substantial amounts of such lactose. A dry material in the form of a powder which I desire to incorporate in the final instantized product, is commingled and contacted with the moist discrete particles, whereby the dry powder particles adhere to the moist particles, with the latter forming nuclei. As a result clumps are formed consisting of the moist particles, with particles of the powder adhering to the moist surfaces with which the dry particles come into contact. More or less penetration of moisture occurs into the adhered dry particles, without, however, material altering their physical shape. The clumps formed in this manner are considerably larger than the particle size of the moist particles, or the particle size of the powder applied to the same.

The clumps generally contain more moisture than is desired in the final product, and therefore they are subjected to a drying operation to reduce the moisture content to the value desired, as for example, from 1% to 3%. Although elevated temperatures may be used in the formation of the moist particles containing lactose in alpha hydrate form, the clumps may be formed at room temperature, with only a minor amount of heating for a short time to remove excess moisture.

The general procedure outlined above is shown in the flow sheet of FIGURE 1. Here operation 10 is applied to a lactose containing material to form moist particles containing lactose in alpha hydrate form. In step 11, the moist particles are commingled with a dry powdered material, whereby the dry powder particles adhere to the surfaces of the moist particles to form clumps. In step 12, excess moisture is removed to form the final dry instantized product.

The material used for forming the moist discrete particles may be lactose by itself, or material containing substantial amounts of lactose, such as non-fat milk solids (i.e. skim milk), or liquid whey formed as a by-product in the manufacture of cheese. Moist discrete particles can be formed of such materials in various ways. For example, spray dried non-fat milk powder (i.e. skim milk powder), or spray dried whey powder, can be moistened by addition of sufficient water to hydrate the lactose content of the same, while at the same time providing a substantial amount of free moisture. For example, the amount of moisture added can be such as to provide a total moisture content of the order of from 10 to 20% for lactose, from 12 to 22% for non-fat milk, and from 11 to 20% for whey. Non-fat milk contains about 52% lactose (dry solids basis) and whey about 75%. These amounts of total moisture are substantially in excess of the amounts required for converting the anhydrous lactose present in the spray dried powder, to the alpha hydrate form. However, the material can be maintained in discrete form, within the moisture content limits just specified. Such amounts of moisture can be added to the dry powdered material either by adding the moisture to powder in dispersed form, or by adding the moisture in atomized condition to a mass of the powder being continually agitated.

Another and simpler procedure which can be used to form the moist discrete particles is to apply spray drying, with seeding of the concentrate supplied to the spray drying operation, and with control of the drying air, as is disclosed in Patent 2,728,678, such a method can be controlled to provide discrete particles of the desired moisture content, as, for example, particles consisting of alpha hydrate lactose crystals, or moist particles of skim milk or whey solids having the lactose content of the same in the crystalline alpha hydrate form.

Step 11 can be carried out either continuously or as a batch operation. Excessive agitation after initial commingling should be avoided to minimize the formation of fines. In a continuous operation, the moist discrete particles can be dispersed in a stream of air or other gas, and the dry particles introduced into such stream with sufficient turbulence to insure contact and adherence of the dry powder particles with the moist particles. As a batch operation, a quantity of the discrete moist particles can be introduced into a rotating drum, together with the dry powdered material, and agitation with commingling continued until the dry powdered particles have become adhered to the moist particles.

The average total moisture content of the clumps formed in step 11 is usually considerably less than the total moisture content of the discrete particles. This simplifies the final operation 12 for removing excess moisture. Step 12 can be carried out by use of suitable drying equipment, as, for example, driers of the type in which the material is contacted with currents of warm dry air. When the process is applied to the production of an instant non-fat milk product which is to be used for making reconstituted milk of beverage quality, care should be taken to avoid excess prolonged heating in step 12, such as might cause substantial denaturing of the casein content. In general it is satisfactory to apply air at temperatures ranging from 180 to 300° F., with the higher temperatures being applied in the final drying stages. Depending somewhat upon the character of the product being produced, the total moisture content in the final product may range, for example, from 1% to 3%.

FIGURE 2 illustrates the procedure applied to produce instantized non-fat dry milk. In this instance, non-fat milk (i.e. skim milk) is applied to step 14, which is carried out in the manner disclosed in Patent 2,728,678 to spray dry the material to the form of moist discrete particles containing from 13% to 20% total moisture. Assuming seeding of the concentrate supplied to the spray drying operation as described in said patent, a considerable part (e.g. from 30% to 60%) of the lactose contained in the discrete moist particles is in the crystalline alpha hydrate form. A short holding period, as, for example, from 3 to 180 seconds will serve to increase the percentage hydration. This period depends upon the moisture content and holding temperature of the powder. For the higher moisture contents and temperature level (e.g. 17% and 120° F.), conversion of the lactose occurs almost immediately, whereas at lower moisture contents and temperature levels (e.g. 14% and 70° F.), conversion may require from 2 to 5 minutes. In step 15, the discrete moist particles are commingled with anhydrous non-fat milk powder, as, for example, the skim milk powder produced by a conventional spray drying operation, having its lactose content in the anhydrous form. Such spray dried skim milk powder may in a typical instance have a particle size such that the bulk of the material will pass through a 200 mesh screen. The discrete moist particles are somewhat coarser, and in a typical instance will be of such size that the bulk of this material will not pass through a 100 mesh screen.

As previously described, commingling in step 15 can be carried out by conveying the discrete moist particles in dispersed condition in a stream of air, with the anhydrous spray dried non-fat milk powder being introduced into the air stream in such a manner as to provide the desired proportioning, with sufficient turbulence whereby the dry particles are caused to contact the surfaces of the moist particles. As a result, the dry anhydrous non-fat milk powder particles and the moist particles are caused to adhere together in the form of clumps. The proportions between the moist discrete particles and the anhydrous non-fat milk powder may vary, and good results can be obtained by proportioning the anhydrous powder whereby the solids of the same comprise about 3 to 75% of the total solids in the final product. The average size of the clumps can be markedly varied by changing such proportions.

In step 16, excess moisture is removed as in the manner previously described. In step 17, the dry material is subjected to sizing, as by screening, whereby fines having a particle size such, for example, as to pass through a 200 mesh screen, are removed. Such fines can be returned to step 15, as indicated.

The final product obtained in accordance with FIGURE 2 has good instant properties in that it can be quickly dispersed in cold water by simply stirring to form a reconstituted non-fat milk. The protein content of the skim milk is not denatured to any material extent during the processing. Therefore, the reconstituted non-fat milk is stable and is not subject to settling. The percentage hydration of the lactose content is dependent somewhat upon the amount of anhydrous non-fat milk powder used in preparing the product, the total moisture content of the moist particles, and the retention time between steps 15 and 16. However, in typical instances, the percentage hydration of the lactose may range upwardly from about 20%, whereby the product is relatively nonhydroscopic and need not be packaged in sealed containers to prevent caking.

The bulk of the clumps produced by the process of FIGURE 2 have a size such that they remain on a 100 mesh screen. Any substantial amount of oversize material may be reduced to desired size limits by passing the same through cracking rolls. For optimum wetting properties, it is desirable for the pour bulk density to be less than about 400 grams per liter.

The procedure described above with reference to FIGURE 2 can be modified in certain respects. Instead of using anhydrous spray dried non-fat milk powder, it is possible to use non-fat milk powder containing flavoring, such as chocolate, and sweetening like dextrose.

In the procedure described above with reference to FIGURE 2, the final product contains lactose originating both with the moist particles and the anhydrous non-fat milk powder employed. In instances where it is desired to produce a final product having a lower total lactose content, the lactose content of the anhydrous non-fat milk powder can be lowered, as by removing a certain part of the lactose content from the skim milk that is spray dried to produce the powder.

My process can be applied to produce products containing ingredients other than non-fat milk solids. For example, instead of applying anhydrous non-fat milk powder, as indicated in FIGURE 2, anhydrous spray dried coffee extract can be applied, thus producing an instantized product containing coffee extract together with lactose and any non-fat milk solids that may be associated with the lactose. A product of this kind can be used to form a hot or cold coffee beverage simply by stirring the product into hot or cold water. Although the product has high wettability and can be readily dispersed by simple stirring, it is relatively stable and nonhygroscopic.

Another product which can be made by use of the process is one containing starch. In such event anhydrous starch powder is supplied to the process in place of the anhydrous non-fat milk powder.

Another product which can be made is one containing corn syrup. In this event dry powdered corn syrup solids, such as may be produced by spray drying, are supplied to the process instead of the anhydrous non-fat milk powder. Here again the moist discrete particles may consist entirely of lactose, or lactose together with other non-fat milk solids.

It is also possible to produce products containing vegetable solids, such as tomato. Thus a tomato concentrate can be spray dried to form a dry powdered material containing the solids of tomatoes, and this material used in place of anhydrous milk powder, in the process of FIGURE 2. If desired, sufficient additional non-fat milk solids and seasoning can be provided.

It will be evident from the foregoing that my process can be applied to produce a wide variety of products. The particles supplied in anhydrous form need only have the ability to develop a sticky surface when moistened by contact with the moist discrete lactose containing particles. Lactose in alpha hydrate form is unique in that moist particles of the same can be maintained discrete. At the same time the properties are such that an anhydrous particle like spray dried non-fat milk contacting the same, is made sticky and caused to adhere thereto.

Examples of my invention are as follows:

*Example 1*

Commercial spray dried non-fat milk powder (i.e. skim milk powder) of good edible quality was moistened with water to provide a total moisture content of about 15%. Sufficient holding was provided after moistening whereby a substantial amount of the lactose content was converted to the alpha hydrate form. While dispersed in a stream of air, this moist material was commingled with anhydrous commercial spray dried non-fat milk powder, in such proportions that the added powder comprised 25% of the total milk solids (dry solids basis) in the final product. The resulting clumps were dried by contact with warm air, commencing with an air temperature of about 180° F., and ending with a temperature of 260° F. The resulting product was in the form of clumps having a total moisture content of about 3.5% and having a size such that the bulk of the material remained upon a 100 mesh screen. This product had good instant properties, in that it was highly wettable in cold water, and could be readily dispersed in cold water by simple stirring to form a stable reconstituted non-fat milk.

*Example 2*

Lactose powder of commercial grade having substantially 98% of its lactose content in the alpha hydrate form, was dispersed in a stream of air and additional moisture added thereto by contacting the same with atomized droplets of water. The resulting material was moist discrete lactose particles having a total moisture content of about 14%. The remainder of the process was carried out in accordance with Example 1, using the moist particles in place of the moist particles of non-fat milk. The resulting product was similar to that produced in Example 1, except that it had a higher lactose and a reduced casein content.

*Example 3*

A nonhygroscopic whey powder having substantially 98% of its lactose content in the form of alpha hydrate was moistened in the manner outlined in Example 2, with a sufficient amount of moisture being added thereto to provide a total moisture content of 15%. The remainder of the process was in accordance with Example 1. The resulting product had substantially the same properties as in Example 1, except for the increased lactose content and the reduced amount of casein.

*Example 4*

Liquid non-fat milk (i.e. skim milk) was converted to the form of moist discrete particles having a total moisture content of 15%, by following the procedure of Patent 2,728,678. Seeding of the concentrate followed by spray drying provided a moist product having a substantial amount of its lactose content in the form of alpha hydrate. The moist particles, while dispersed in a stream of conveying air, were commingled with an anhydrous spray dried non-fat milk powder, the same as in Example 1. The resulting product had substantially the same properties as described in Example 1.

*Example 5*

An anhydrous coffee extract powder was prepared by spray drying an aqueous coffee concentrate. An anhydrous concentrate of commercial lactose was treated in accordance with the method of Patent 2,728,678, controlled to produce a discrete material in the form of moist lactose particles, having substantially 98% of its lactose in the alpha hydrate form, and having a total moisture content of about 14%. The discrete moist particles were dispersed in a stream of conveying air and commingled with the coffee extract powder. The proportions were such that in the final product the coffee solids comprised 60% of the total solids in the product. Commingling as described caused the anhydrous coffee powder to contact and adhere to the moist lactose particles, thus forming clumps having a total moisture content of about 7%. These clumps were dried by contacting them with drying air commencing at a temperature of about 180° F. and ending with a higher temperature of about 250° F. The resulting product had instant properties in that it was highly wettable in either hot or cold water and could be readily dispersed in either hot or cold water by simple stirring.

*Example 6*

The same procedure described in Example 5 was followed, using an anhydrous starch powder instead of the coffee extract powder. The starch employed was of the pregelatinized type. The resulting product was a free flowing granular material, relatively wettable compared to powdered starch, and capable of being quickly dispersed in water to form a starch gel.

*Example 7*

The same procedure was followed as in Example 5 except that spray dried corn syrup powder was employed in place of the anhydrous coffee extract powder. The resulting product had good instant properties. It was highly wettable in either hot or cold water, and could be quickly dispersed in either hot or cold water by simple stirring.

I claim:
1. In a process for the manufacture of a dry food product, the steps of forming discrete moist particles having a substantial amount of lactose essentially in the alpha hydrate form, and having a moisture content within the range of about 10 to 22%, commingling the moist particles while in dispersed condition with moisture absorbent anhydrous powder particles of edible material, whereby the powder particles contact and adhere to the moist particles to form clumps, and whereby moisture from the moist particles is absorbed by the adhering powder, said first-named particles being relatively coarse compared to the anhydrous powder particles, and then removing excess moisture from the clumps.

2. A process as in claim 1 in which the lactose containing particles consist essentially of lactose in the alpha hydrate form.

3. A process as in claim 1 in which the moist particles contain whey solids.

4. A process as in claim 1 in which the moist particles consist of non-fat milk solids.

5. In a process for the manufacture of a dry food product, the steps of forming discrete moist lactose containing particles having a moisture content within a range of about 10 to 22%, a substantial part of the lactose content being essentially in the form of alpha hydrate, commingling such moist particles while in dispersed condition with anhydrous non-fat milk powder whereby the milk powder particles adhere to the surface of the moist particles to form clumps, and whereby moisture from the moist particles is absorbed by the adhering powder, said first named particles being relatively coarse compared to the milk powder particles, and then removing excess moisture from the clumps.

6. A process as in claim 5 in which a period of retention is interposed between the commingling step and the removal of excess moisture to permit further hydration of the lactose present.

References Cited in the file of this patent

UNITED STATES PATENTS

| | | |
|---|---|---|
| 2,088,606 | Peebles | Aug. 3, 1937 |
| 2,630,391 | Templeton | Mar. 3, 1953 |
| 2,661,294 | Meade | Dec. 1, 1953 |
| 2,665,208 | Spieser | Jan. 5, 1954 |
| 2,832,686 | Louder et al. | Apr. 29, 1958 |
| 2,835,586 | Peebles | May 20, 1958 |
| 2,850,388 | Peebles | Sept. 2, 1958 |
| 2,851,364 | Peebles | Sept. 9, 1958 |
| 2,856,288 | Peebles | Oct. 14, 1958 |
| 2,856,290 | Peebles | Oct. 14, 1958 |
| 2,856,318 | Peebles | Oct. 14, 1958 |
| 2,897,084 | Peebles | July 28, 1959 |
| 2,900,256 | Scott | Aug. 18, 1959 |